United States Patent [19]
Matsumiya et al.

[11] Patent Number: 6,067,165
[45] Date of Patent: May 23, 2000

[54] POSITION CALIBRATING METHOD FOR OPTICAL MEASURING APPARATUS

[75] Inventors: Sadayuki Matsumiya; Takao Kawabe; Dahai Yu, all of Kanagawa, Japan

[73] Assignee: Mitutoyo Corporation, Japan

[21] Appl. No.: 09/151,506

[22] Filed: Sep. 11, 1998

[51] Int. Cl.[7] .................................................. G01B 11/00
[52] U.S. Cl. .......................... 356/401; 356/399; 356/400
[58] Field of Search ..................................... 356/399, 400, 356/401

[56] References Cited

U.S. PATENT DOCUMENTS

| | | | |
|---|---|---|---|
| 4,920,273 | 4/1990 | Sacks et al. | 250/560 |
| 4,982,504 | 1/1991 | Söderberg et al. | 33/502 |
| 5,187,874 | 2/1993 | Takahashi et al. | 33/502 |
| 5,325,180 | 6/1994 | Chappelow et al. | 356/401 |

*Primary Examiner*—Robert H. Kim
*Attorney, Agent, or Firm*—Webb Ziesenheim Logsdon Orkin & Hanson, P.C.

[57] ABSTRACT

In an optical measuring apparatus so structured as to hold a CCD camera and a laser displacement gauge so that they can be three-dimensionally driven at the same time on a stage, a jig including two straight, non-parallel line segments which can be measured by the CCD camera and the laser displacement gauge in the projection plane along the Z-axis direction is mounted on the stage; the straight line segments are measured in the projection plane by the CCD camera and the laser displacement gauge to obtain formulas of these segments; the obtained formulas are subjected to the arithmetic operation to calculate an offset value of the X and Y plane coordinate centers between the CCD camera and the laser displacement gauge; and the offset value is used as position calibration data of the CCD camera and the laser displacement gauge to perform position calibration of the measurement data.

3 Claims, 4 Drawing Sheets

POSITION CALIBRATING METHOD FOR OPTICAL MEASURING APPARATUS

BACKGROUND OF THE INVENTION

The present invention relates to a position calibrating method for a measuring apparatus structured in such a manner that a plurality of optical length measuring devices are provided.

When calibrating a position of a contact detector in a three-dimensional coordinate measuring device, a master ball has been generally used. The master ball has good sphericity whose diameter is calibrated with a high accuracy. Specifically, three or more points on a surface of the master ball are measured by the contact detector and an arithmetic operation is performed based on these surface coordinates to calculate a central coordinate of the master ball. The thus-obtained central coordinate of the master ball is used as a reference coordinate to effect position calibration of the measurement data when actually measuring a workpiece.

However, when using an optical length measuring device (for example, an image measuring head using a CCD or a laser displacement gauge which is a non-contact detector), a point on an inclined surface must be measured when attempting calibration by using the same technique employing the master ball as in the case of using the contact detector. An error will be included in measurement of the vertical axis (Z-axis) coordinate value of that point because the light is not reflected on the inclined (curved) surface in the vertical axis direction when irradiating the light from the vertical axis direction. This error adversely affects a result of the arithmetic operation of the master ball central coordinate value and leads to another serious error in the Z and Y coordinate values of the obtained central coordinate value. Further, the usual optical length measuring device cannot bring the inclined surface into focus, and hence the measuring point must be selected only from an extremely small area, which also causes an arithmetic operation error.

The specific description will be given as to the influence of an error in the Z-axis coordinate value at a given measured point on the central coordinate value to be obtained when calculating the central coordinate value from coordinate values of four measuring points on the surface of the master ball. The master ball has a diameter R as shown in FIG. 6 and its spherical surface can be represented by the following Expression 1 with its origin in the center.

Expression 1

$$x^2+y^2+z^2=R^2$$

Assuming that the central coordinate of the master ball is (a, b, c), the spherical surface can be represented by the following Expression 2.

Expression 2

$$(x-a)^2+(y-b)^2+(z-c)^2=R^2$$

The central coordinate is obtained by measuring four points on a surface of such a master ball, i.e., a position of an intersection with the Z-axis P1 (0, 0, R) and three surface positions selected from the circumference of the point P1 and each having an angle θ inclined from the z-axis P2 (Rsinθ, 0, Rcosθ), P3 (0, Rsinθ, Rcosθ) and P4 (Rsinθ, 0, Rcosθ). It is assumed that P1, P2 and P4 in the above respective data are accurately measured and an error δ is included in the z coordinate value in the coordinate of the measured point P3, which results in P3 (0, Rsinθ, Rcosθ+δ). Here, the operation formula for calculating the central coordinate value (a, b, c) of the master ball can be represented by the following Expression 3 by substituting for measured data at points P1, P2, P3 and P4 in Expression 2.

Expression 3

$$a^2+b^2+(R-c)^2=R^2 \quad (1)$$

$$(R\sinθ-a)^2+b^2+(R\cosθ-c)^2=R^2 \quad (2)$$

$$a^2+(R\sinθ-b)^2+(R\cosθ-c+δ)^2=R^2 \quad (3)$$

$$(R\sinθ+a)^2+b^2+(R\cosθ-c)^2=R^2 \quad (4)$$

The X coordinate value a can be obtained as shown by the following Expression 4 by subtracting the formula (2) and the formula (4) in Expression 3.

Expression 4

$$4R a \sinθ=0$$

$$\therefore a=0$$

By substituting a=0 in the formulas (1), (2) and (3), (1'), (2') and (3') shown by the following Expression 5 can be obtained.

Expression 5

$$b^2+(R-c)^2=R^2 \quad (1')$$

$$(R\sinθ)^2+b^2+(R\cosθ-c)^2=R^2 \quad (2')$$

$$(R\sinθ-b)^2+(R\cosθ-c+δ)^2=R^2 \quad (3')$$

The Z coordinate value c can be obtained as shown by the following Expression 6 by subtracting the formulas (1') and (2').

Expression 6

$$2Rc(\cosθ-1)=0$$

$$\therefore c=0$$

When substituting c=0 in the formulas (2') and (3') and subtracting them, the Y coordinate value b can be obtained as shown by the following Expression 7.

Expression 7

$$b=(δ^2+2Rδ\cosθ)/2R\sinθ$$

In this way, if an error is included in the z coordinate value measured with respect to the measured point P3 whose Y coordinate value is not 0, an error is included in the Y coordinate value of the central coordinate value to be obtained. Similarly, if there is an error in the z coordinate value when measuring the point P2 or P4 whose X coordinate value is not 0, an error is included in the x coordinate value of the central coordinate value to be obtained.

As described above, when adopting the optical length measuring device and trying position calibration by using the master ball, there occurs such a problem as that the central coordinate value of the master ball, i.e., the position data for calibration cannot be accurately obtained due to the influence of the error in measurement of the vertical axis coordinate value. Further, since the optical length measuring device cannot bring the inclined (curved) surface into focus, the measuring point is disadvantageously restricted in a small area, which makes it difficult to obtain the accurate calibration data.

SUMMARY OF THE INVENTION

In view of the above-described problems, it is an object of the present invention to provide, in an optical measuring apparatus configured in such a manner that a plurality of optical measuring devices are supported so as to be three-dimensionally driven at the same time relative to a stage on which a workpiece is mounted, a position calibrating method capable of easily and accurately obtaining position calibration data.

Briefly, according to this invention, there is provided in a position calibrating method for a plurality of optical length measuring devices in an optical measuring apparatus configured so as to provide a plurality of the optical length measuring devices supported so that they can be three-dimensionally driven at the same time relative to a stage on which a workpiece is mounted, the steps of: preparing a calibration jig defining a reference pattern with which position measurement is possible in a horizontal plane by each optical measuring device, formed on a base plate and mounting it on the stage; measuring a coordinate of the reference pattern of the calibration jig with each of the optical length measuring devices; subjecting a coordinate value of the reference pattern obtained by each of the optical length measuring devices to an arithmetic operation to calculate an offset value in the horizontal plane between the respective optical length measuring devices; and using the thus-obtained offset value as position calibration data for each of the optical length measuring devices to perform position calibration of the measurement data subsequently gathered by each of the optical length measuring devices.

According to a preferred embodiment, the optical measuring apparatus has both an image measuring instrument using a CCD camera and a laser displacement gauge provided as the plurality of the optical length measuring devices.

Further, as a calibration jig, there is employed, for example, a pattern which includes two non-parallel straight line segments and has a small height and sharp edges, the pattern formed as the reference pattern on the base plate.

The optical measuring apparatus, which is an object of the present invention, is so structured as to have at least two optical length measuring devices. For example, there is a system which uses a CCD camera as a first length measuring device to apply image processing on image pickup data and to obtain a shape and also which uses a laser displacement gauge as a second measuring device. The system uses a CCD camera to pickup an image of an object to be measured in a relatively large area in order to measure the shape and uses the laser displacement gauge to measure a very small area of the object. The small area to be measured would be hard to focus and pickup by the CCD camera. The system is applied in usage to small shapes and to shapes having a relatively large area with high accuracy.

In order to achieve the positional correlation of measurement data of two optical length measuring devices by such a system, it is required to accurately obtain an offset value between the two length measuring devices. In this invention, as a position calibration jig for the two provided optical length measuring devices, there is employed a calibration jig having a reference pattern formed thereon. With each optical measuring device, position measurement in a horizontal plane is possible. The coordinate value of the reference pattern obtained by each of the optical length measuring devices is subjected to an arithmetic operation to calculate an offset value in a horizontal plane between the respective optical measuring devices, and the thus-obtained offset value is used as calibration data indicative of the positional correlation.

According to the present invention, since an offset in the horizontal plane is obtained by measuring the pattern only in the horizontal plane, the measurement in the vertical axis direction does not influence the horizontal coordinate value on the plane as in the case of using the master ball, and position calibration of the two optical length measuring devices can be performed with high accuracy.

These and other objects and features of the present invention will become more apparent from the following detailed description with reference to the accompanying drawings.

DETAILED DESCRIPTION OF THE PREFERRED EMBODIMENTS

Figure 1:
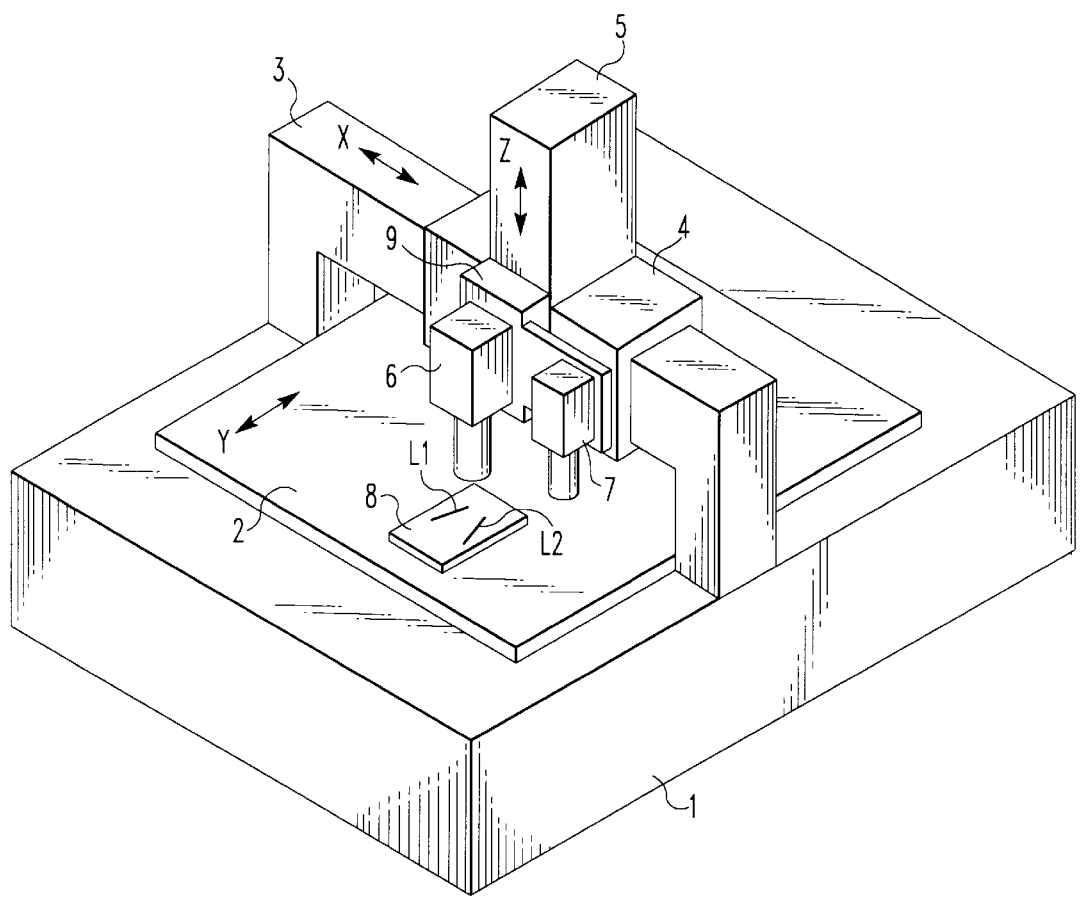
FIG. 1 shows a schematic structure of an optical measuring apparatus according to one embodiment of the present invention.

FIG. 1 shows a schematic structure of an optical measuring apparatus according to one embodiment of the present invention. On a base 1, a stage 2 (its drive mechanism is omitted) is mounted. An object to be measured is mounted on the stage 2. The stage 2 can be driven in the Y-axis direction. An X-axis guide 3 is fixed to the base 1. A carriage member 4 is attached to the X-axis guide 3 in such a manner that it can slide in the X-axis direction. A Z-axis rod 5 is integrally fixed to the sliding member 4. A supporting member 9 is attached to the Z-axis rod 5 so that it can slide in the Z-axis direction. A CCD camera 6 constituting a first optical length measuring device and a laser displacement gauge 7 constituting a second optical length measuring device are fixed to the supporting member 9.

With this structure, the CCD camera 6 and the laser displacement gauge 7 can simultaneously move in directions of the three axes X, Y and Z relative to the object (workpiece) with a fixed positional relationship maintained.

The CCD camera 6 picks up an image of the object to be measured that is mounted on the stage 2 and performs image processing to measure the shape. The dimension in the height direction (Z-axis direction) is obtained by the focusing adjustment. The focusing adjustment is difficult in the case of picking up an image in a very small area and hence a relatively large image must be picked up. In other words, it is hard for the CCD camera 6 to measure the height in a very small area. Moreover, although the focal depth of the CCD camera 6 depends on lenses, it ranges between 1 $\mu$m and several $\mu$m, and the focal depth less than this range leads to the judgement that the focusing is successful, resulting in a measurement error.

Therefore, in order to measure the height in a very small range, the laser displacement gauge 7 is employed. The laser displacement gauge 7 can very accurately measure the height with a resolution of 0.01 $\mu$m by adopting a laser holoscale.

Figure 2:
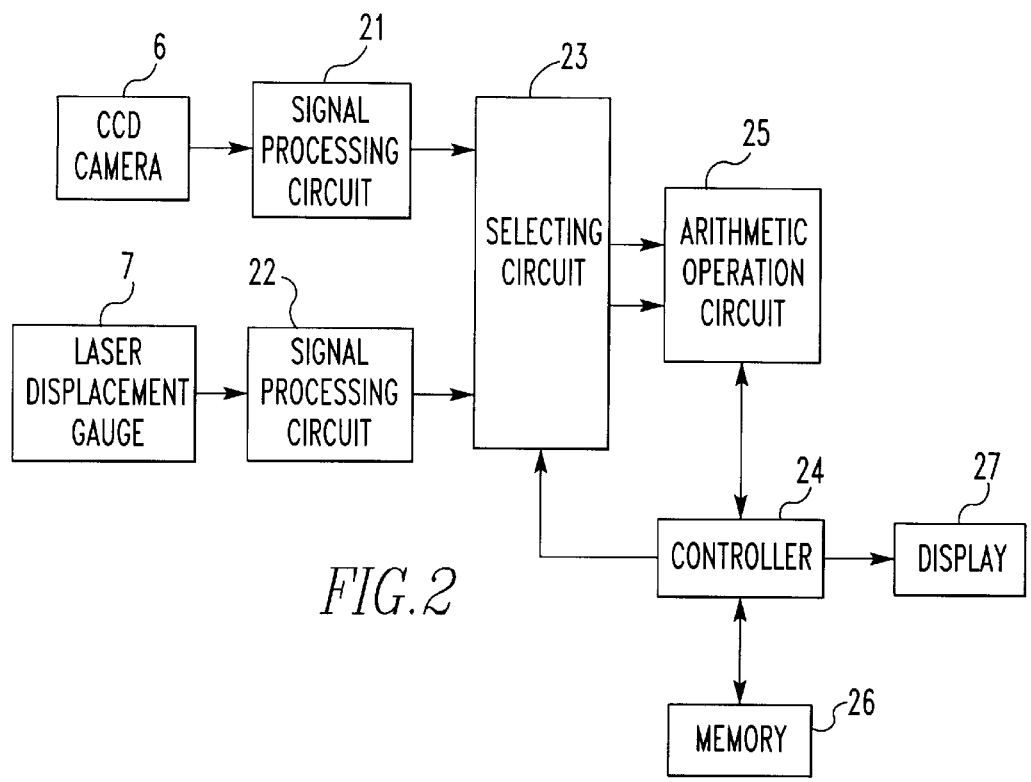
FIG. 2 shows the structure of a signal processing system for the embodiment of FIG. 1.

Specifically, the image data obtained by picking up an image of the object to be measured by the CCD camera 6 is, for example, processed by a signal processing circuit 21 as shown is FIG. 2 and selected by a selecting circuit 23 controlled by a controller 24 to be fed to an arithmetic operation circuit 25. The laser displacement gauge 7 scans the same object to measure the height of the same. The measurement data obtained by the laser displacement gauge 7 is processed in the signal processing circuit 21 and selected by the selecting circuit 23 to be supplied to the arithmetic operation circuit 25. The arithmetic operation circuit 25 establishes the positional correlation of the data gathered by both devices to obtain the three-dimensional shape of the object. The measured shape is displayed, e.g., on a display 27. In the above-mentioned measuring operation, the positional calibration between the CCD camera 6 and the laser displacement gauge 7 is required in order to achieve positional correlation of the data obtained by the CCD camera 6 and the data obtained by the laser displacement gauge 7 and, therefore, the accurate offset value including fixing errors of both members must be known in advance. The description will now be given as to the specific method for obtaining the offset value to perform position calibration.

In this embodiment, a flat, plate-type calibration jig 8 is set on the stage 2 as shown in FIG. 1 in order to obtain the offset value between the CCD camera 6 and the laser displacement gauge 7.

Figure 3A:
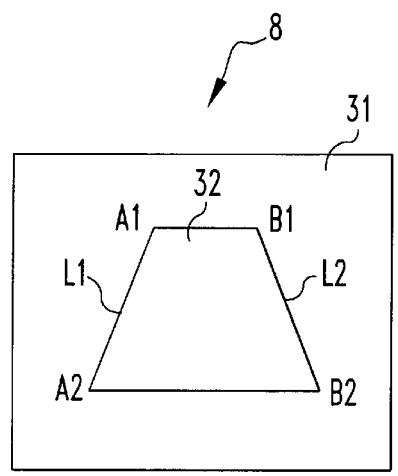
FIGS. 3a and 3b show a plan view and a side view, respectively, of a position calibration jig for the embodiment of FIG. 1.
Figure 3B:
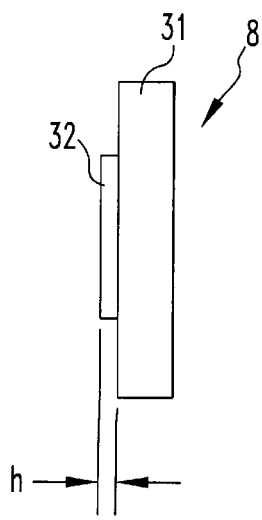
Figure 4:
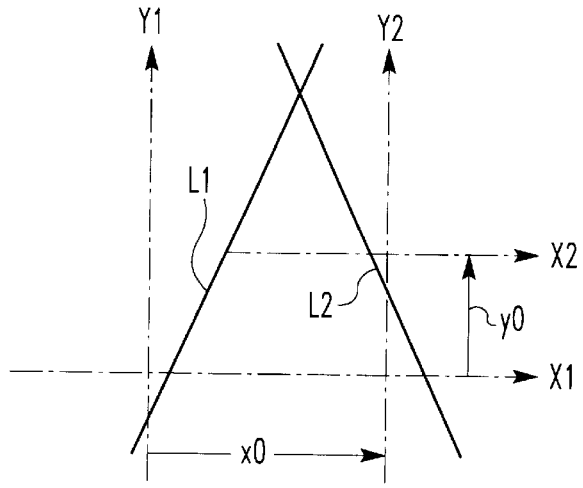
FIG. 4 is a view for explaining a method for calculating an offset value for position calibration.

FIGS. 3a and 3b are a plan view and a side view, respectively, of the calibration jig 8. As shown in the drawing, this jig 8 has a trapezoidal pattern 32 formed by a light reflector, such as a metal film, as a reference pattern so that it can be set within a view area of the CCD camera 6. The trapezoidal pattern 32 is so formed as to have sharp edges and a small height h that is within a length measuring area of the laser displacement gauge 7 i.e., includes two non-parallel sides, i.e., a straight line segment L2 between B1 and B2 and straight line segment L1 between A1 and A2. These line segments L1 and L2 are measured by the CCD camera 6 and the laser displacement gauge 7 to obtain the calibration data in the following manner.

When the CCD camera 6 picks up an image of the jig 8 and the well-known edge detection is utilized to perform image processing, the two line segments L1 and L2 can be obtained. The laser displacement gauge 7 is used to perform X-direction scanning and edge detection at two different points on the Y axis.

Assuming that the coordinates on the light receiving planes of the CCD camera 6 and the laser displacement gauge 7 are determined as (X1, Y1) and (X2, Y2) and a difference between their central coordinates, i.e., the offset value is determined as (x0, y0), the relationship between the formula for obtaining the line segment L1 with the CCD camera 6 and the same with the laser displacement gauge 7 can be represented by the following Expression 8.
Expression 8

$y = a_{11}x + b_{11}$ $y - y0 = a^{12}(x - x0) + b_{12}$

Similarly, the relationship between the formula for obtaining the line segment L2 with the CCD camera 6 and the same with the laser displacement gauge 7 can be represented by the following Expression 9.
Expression 9

$y = a21x + b21$ $y - y0 = a22(x - x0) + b22$

In regard of measurement using the CCD camera 6 and the laser displacement gauge 7, one of them is used to carry out measurement and the measuring system is moved in the X- and Y-axis directions to subsequently perform measurement by using the other, and the relative positional relationship of the above Expressions 8 and 9 can be obtained by taking into account a quantity of movement in the X and Y horizontal planes of the measuring system during two times of measurement.

Since the inclinations of the line segments L1 and L2 can be equally obtained by using the CCD camera 6 and the laser displacement gauge 7 irrespective of the two measuring systems, they are $a_{11} = a_{12} (=a_1)$, $a_{21} = a_{22} (=a_2)$. When performing the arithmetic operation for substituting them in Expression 8 and Expression 9 and eliminating x and y, the offset value (x0, y0) of the two central coordinates can be obtained as shown by the following Expression 10.
Expression 10

$x0 = [(b_{21} - b_{22}) - (b_{11} - b_{12})]/(a_1 - a_2)$ $y0 = [a_1(b_{21} - b_{22}) - a_2(b_{11} - b_{12})]/(a_1 - a_2)$

The above arithmetic operation can be easily executed by using the arithmetic operation processing circuit 25 shown in FIG. 2. Since the offset value (x0, y0) is obtained only from the measurement data in the projection plane of the jig 8, i.e., the horizontal plane, $a_1$, $a_2$, $b_{11}$, $b_{12}$, $b_{21}$ and $b_{22}$ can be accurately obtained and they are not adversely influenced by the measurement error of the Z-axis coordinate as is different from the case using the master ball. The obtained offset value is held in, for example, a memory 26 shown in FIG. 2 as the position calibration data representing the relative position of the two measuring instruments.

With the thus-obtained position calibration data, the two-dimensional shape of the specific object to be measured can be measured by the CCD camera 6 while the height of the same at respective parts can be measured by the laser displacement gauge 7 so that the positional correlation of their measurement data can be accurately obtained while measuring the three-dimensional shape of the object to be measured.

Figure 5A:
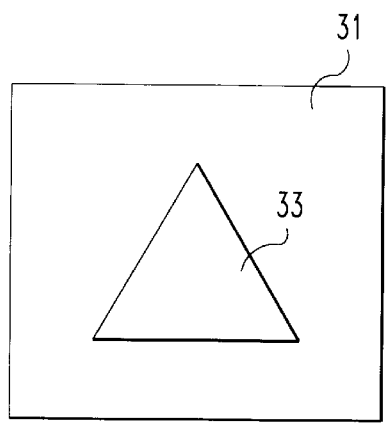
FIGS. 5a and 5b show plan views of calibration jigs according to other embodiments.

The present invention is not restricted to the foregoing embodiment. Although the calibration jig 8 having the trapezoidal pattern 32 formed as shown in FIG. 3a is used in the embodiment, a triangular pattern 33 may be used as shown in FIG. 5a as another calibration jig 8 having two non-parallel straight line segments. In such a case, the triangular pattern 33 also has a flat shape, sharp edges and a small height. In this case, the offset value can be obtained by the processing similar to that in the above embodiment.

Figure 5B:
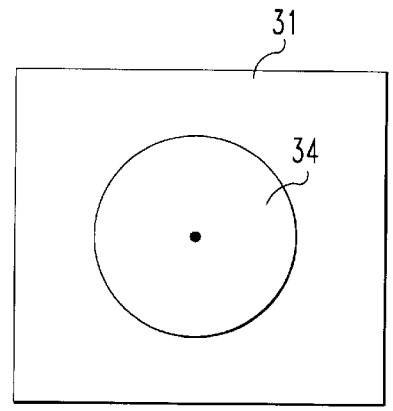
Figure 6:
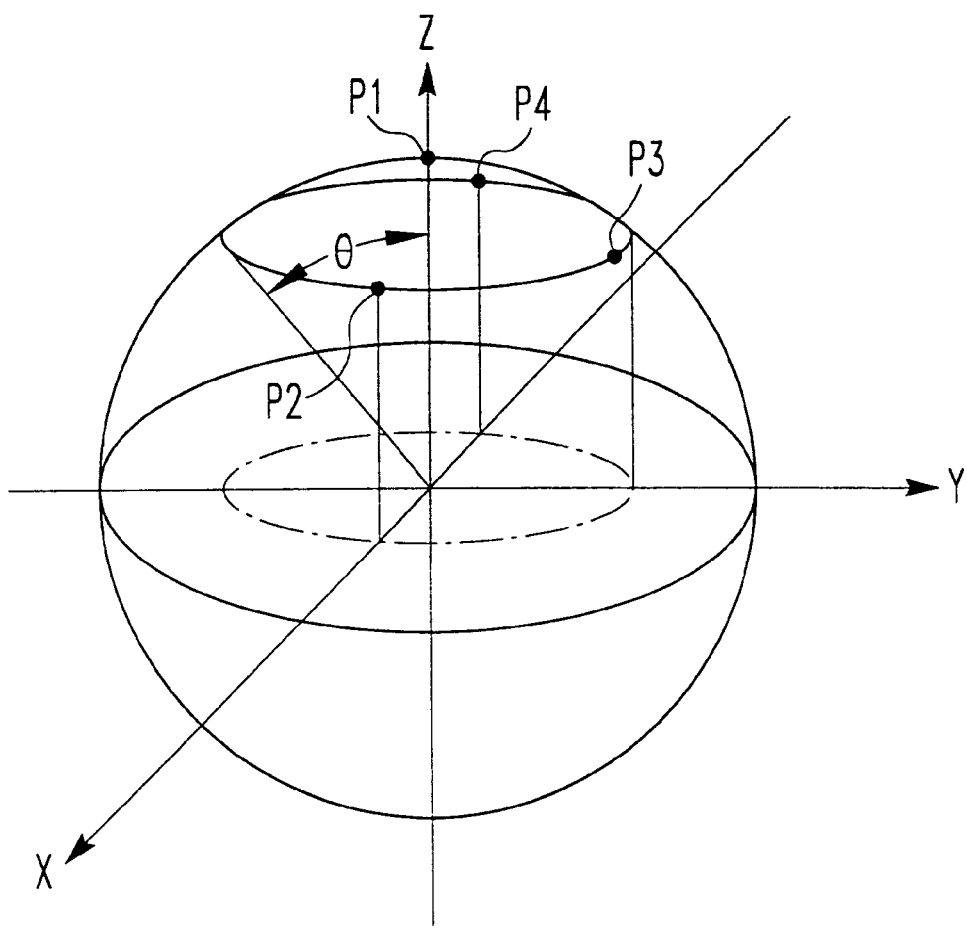
FIG. 6 is a view for explaining a position calibration error caused in case of using a master ball.

Moreover, as shown in FIG. 5b, a jig 8 having a circular pattern 34 as a reference pattern may be also used. In this case, the circular pattern 34 also has a flat shape, a sharp edge and a small height, and its diameter is accurately determined. In the case of this circular pattern 34, the positional relation between the center of the circular pattern 34 and the center of the CCD camera 6 can be obtained by simply processing the image pickup data from the CCD camera 6, while the laser displacement gauge 7 can also be used to perform X-axis scanning with an arbitrary Y-axis coordinate in order to detect two edges, and the positional relation between the center of the circular pattern 34 and the center of the laser displacement gauge 7 can be obtained from the data processing. Thereafter, the offset value between the CCD camera 6 and the laser displacement gauge 7 can be calculated from these data.

Although the CCD camera 6 and the laser displacement gauge 7 are used as the two optical length measuring devices in the above embodiment, this invention can be similarly applied to combinations of other length measuring devices. For example, the position calibration method according to the present invention is effective with respect to a system in which two image heads for obtaining an infrared image and an ultraviolet image of an object to be measured are provided to measure the shape including the inner structure of the object to be measured. The method is useful in a system in which length measuring devices are provided to carry out measurement over a wide area. In addition, the present invention can also be applied to a system in which three or more optical length measuring devices are provided.

As described above, according to the present invention, a jig 8 having a predetermined plane reference pattern formed on its base plate is used for position calibration of the two optical length measuring devices; the reference pattern coordinate value of the jig 8 is obtained by the respective optical length measuring devices; the obtained results are processed to calculate an offset value in the horizontal plane of the two optical length measuring devices; and the offset value is regarded as the position calibration data indicative of the correlation of the two devices; and whereby measurement in the vertical axis direction with degraded accuracy does not influence the coordinate value on the plane as in the case of using the master ball, effecting position calibration in the horizontal planes of the two optical length measuring devices with high accuracy.

While the invention has been described in conjunction with preferred specific embodiments thereof, it will be understood that this description is intended to illustrate and not limit the scope of the invention, which is defined by the following claims.

Having thus described our invention with the detail and particularity required by the Patent Laws, what is desired protected by Letters Patent is set forth in the following claims.

What is claimed is:

1. A position calibrating method for a plurality of optical length measuring devices in an optical measuring apparatus configured with said plurality of the optical length measuring devices supported to be three-dimensionally driven relative to a stage on which a workpiece may be mounted, comprising the steps of:

preparing a calibration jig defining a reference pattern with which position measurement is possible in a horizontal plane by each optical measuring device formed on a base plate and mounting said calibration jig on the stage;

measuring a coordinate of the reference pattern of the calibration jig with each of the optical length measuring devices;

subjecting a coordinate value of the reference pattern obtained by each of the optical length measuring devices to an arithmetic operation to calculate an offset value in the horizontal plane between the respective optical length measuring devices; and using the thus-obtained offset value as position calibration data for each of the optical length measuring devices to perform position calibration of the measurement data subsequently gathered by each of the optical length measuring devices.

2. The position calibrating method of claim 1, wherein the optical measuring devices comprise both an image measuring instrument using a CCD camera and a laser displacement gauge provided.

3. The position calibrating method of claim 1, wherein the calibration jig has a pattern formed on the base plate as the reference pattern, the pattern including two non-parallel straight line segments and having a small height and sharp edges.

* * * * *

UNITED STATES PATENT AND TRADEMARK OFFICE
CERTIFICATE OF CORRECTION

PATENT NO. : 6,067,165
DATED : May 23, 2000
INVENTOR(S) : Sadayuki MATSUMIYA et al.

It is certified that error appears in the above-identified patent and that said Letters Patent is hereby corrected as shown below:

On the Title Page insert --[30] Foreign Application Priority Data
September 12, 1997        Japan            9-248939--

Signed and Sealed this

Third Day of April, 2001

*Attest:*

NICHOLAS P. GODICI

*Attesting Officer*    *Acting Director of the United States Patent and Trademark Office*